June 10, 1958 M. J. SCHLITTERS 2,837,974
HOLDER FOR ROTARY RECESSING TOOL
Filed March 27, 1957 2 Sheets-Sheet 1
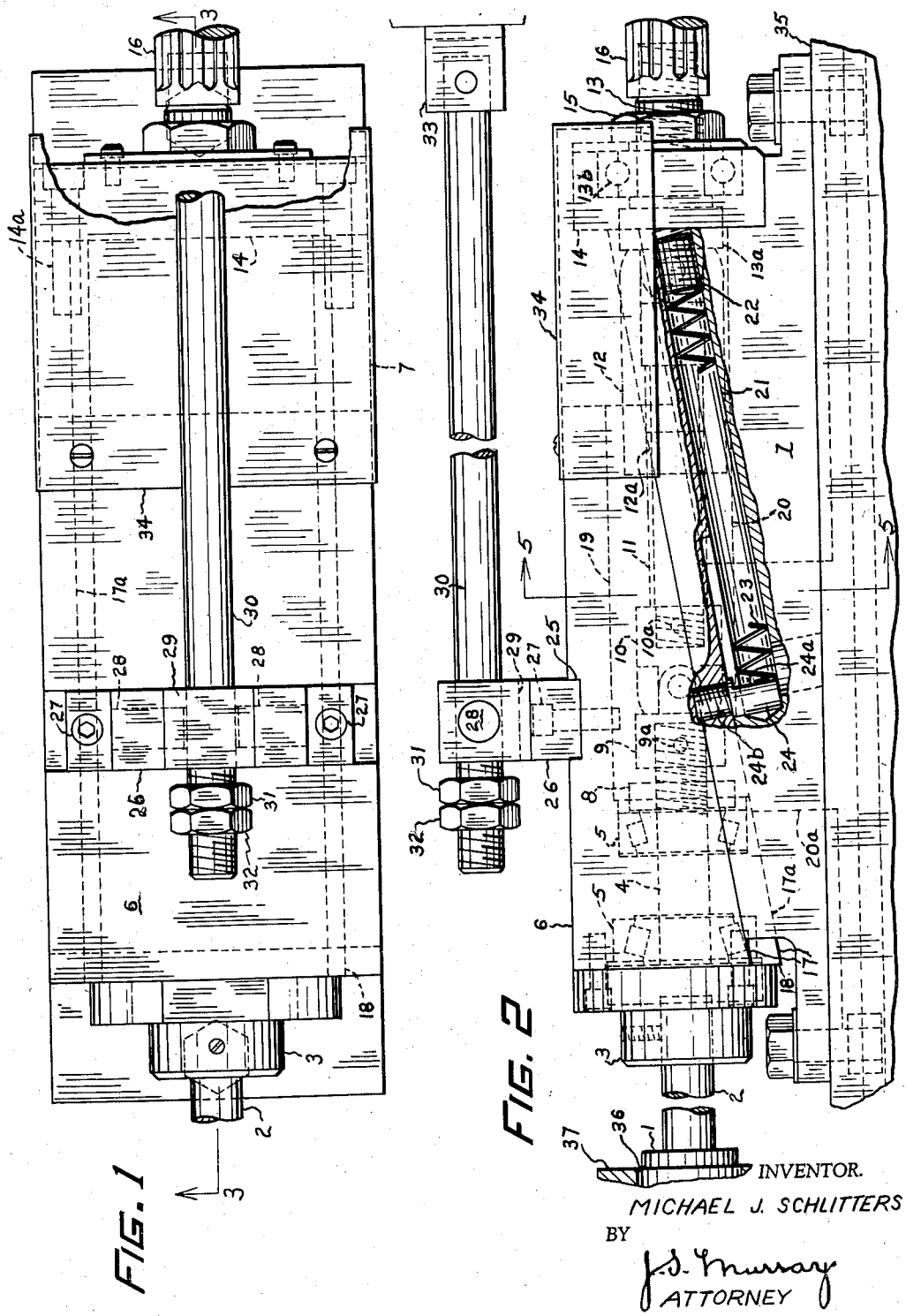
INVENTOR.
MICHAEL J. SCHLITTERS
BY
ATTORNEY June 10, 1958 M. J. SCHLITTERS 2,837,974
HOLDER FOR ROTARY RECESSING TOOL
Filed March 27, 1957 2 Sheets-Sheet 2
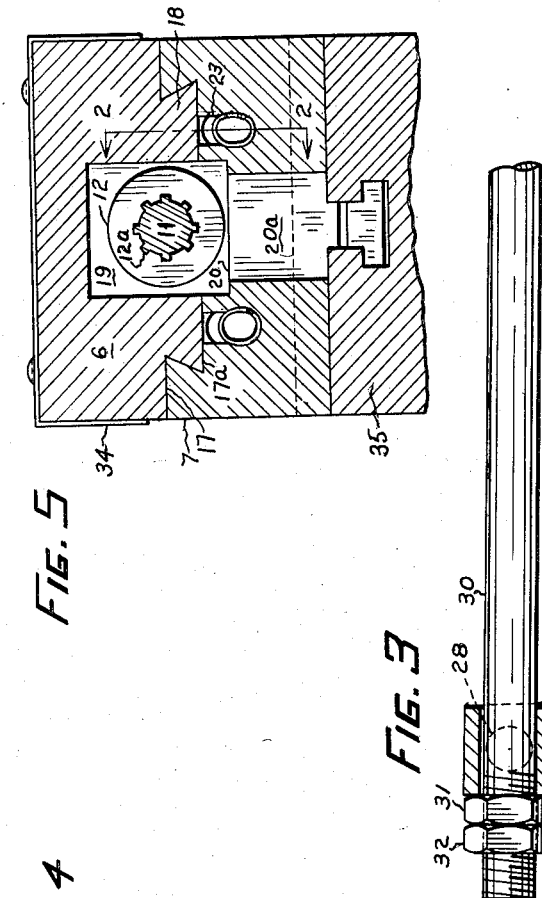
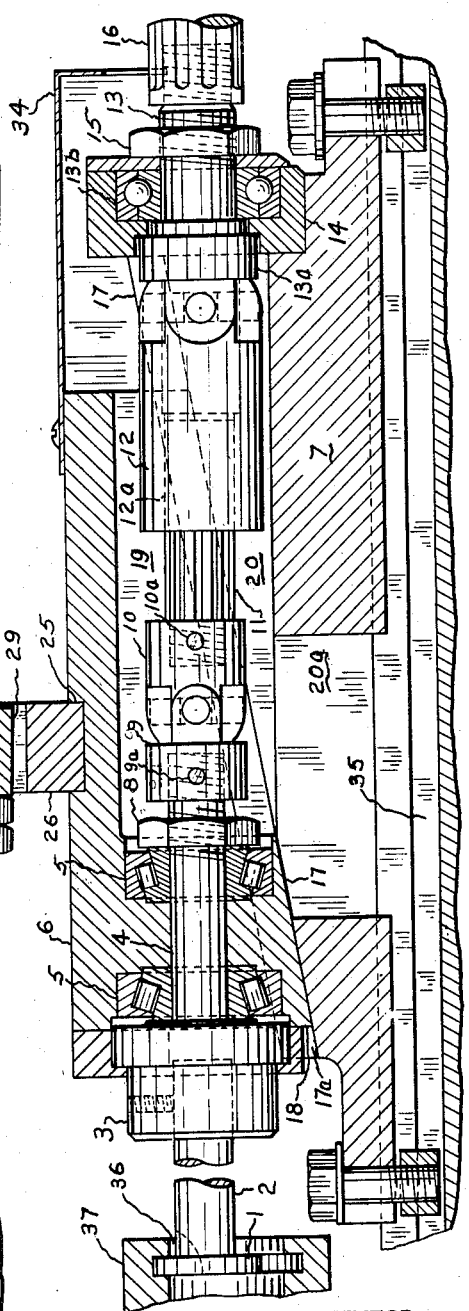
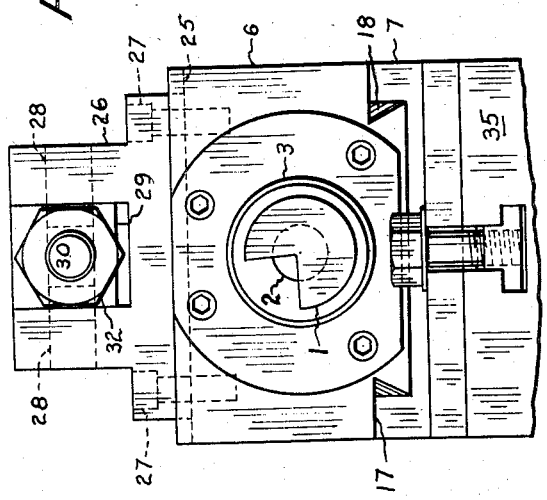
INVENTOR.
MICHAEL J. SCHLITTERS
BY
*J. S. Murray*
ATTORNEY

United States Patent Office 2,837,974
Patented June 10, 1958

2,837,974

HOLDER FOR ROTARY RECESSING TOOL

Michael J. Schlitters, Detroit, Mich.

Application March 27, 1957, Serial No. 648,929

4 Claims. (Cl. 90—15)

This invention relates to holders for rotary recessing cutters and particularly to such holders as are applicable to screw machines.

The invention may be considered an improvement on the subject matter of my Patent 2,495,291, issued January 24, 1950.

Disclosed in said patent is a holder comprising a lower member mounted on a slide serving to feed the holder to a work-piece. Surmounting said member is a tool-receiving upper member presenting an inclined bottom cam face to a similar top face of the lower member, whereby the upper member, upon encountering a stop, will be gradually raised by a relative camming action of the two inclined faces. Thus a cutting tool fixed on the upper member will take a recessing cut within a bore or other opening of a work-piece.

An object of the invention is to journal in the upper member of such tool holder a driven shaft adapted to carry a cutter, and to journal in the lower member a drive shaft to rotate the driven shaft.

Another object is to so provide a flexible coupling means between the shafts as to afford the latter such relative movement transverse to their axes as is required by the camming action, while maintaining a continuous drive.

Another object is to adapt said coupling means to afford relative movement between said shafts in the direction of their axes, while maintaining a continuous drive.

Another object is to provide a flexible coupling affording a continuous drive during relative movement of said shafts along and transverse to their axes.

These and various other objects are attained in the construction hereinafter described and illustrated in the accompanying drawings, wherein:

Fig. 1 is a top plan view of the improved tool holder.

Fig. 2 is a side elevation in partial section on the line 2—2 of Fig. 5, showing the construction before the camming action has occurred.

Fig. 3 is a longitudinal vertical section on the line 3—3 of Fig. 1, showing the construction subsequent to a camming action.

Fig. 4 is a front view of the holder.

Fig. 5 is a view in cross-section on the line 5—5 of Fig. 2.

In these views, the reference character 1 designates a recessing cutter which may be designed to meet requirements of any particular job. The illustrated cutter is radially set into the forward end of a cutter bar 2 and secured by any conventional means, as brazing. The bar 2 is socketed in and forwardly projects from a chuck 3, formed on the forward end of a driven shaft 4 journaled in a pair of anti-friction bearings 5 in the forward end of the upper member 6 of a two-part tool holder 6 and 7. The rear end portion of the shaft 4 is threaded to receive a nut 8, retaining said chuck and bearings in assembly.

The shaft 4 terminally screws into an element 9 of a universal joint 9, 10, and is secured against rotation therein by a set screw 9a or the like. The element 10 of said universal joint has a tapped socket receiving the threaded forward end of a splined shaft 11, and carries a set screw 10a to prevent relative rotation. Said splined shaft occupies an intermediate position between the described universal joint and a second universal joint including front and rear members 12 and 13a, the front member being an elongated sleeve having a splined socket 12a to slidably receive the shaft 11. The member 13a is integrally formed on a relatively short drive shaft 13, journaled in an anti-friction bearing 13b mounted in a block 14 fixed by bolts 14a on the rear end of the member 7. The axial position of the of the shaft 13 is maintained by a nut 15 threaded on the shaft 13. The latter terminally engages and is rotatively driven by a splined shaft 16. Any conventional power source (not shown) may rotatively drive the shaft 16, the splines affording an axial movement of such shaft relative to such source.

The members 6 and 7 have interengaging plane cam faces 17 seating and supporting the upper member on the lower one and rearwardly and upwardly diverging from the direction of advance and retraction of the holder at an angle preferably approximating ten degrees. The face 17 of the lower member is longitudinally and centrally formed with a groove 17a, having its opposed walls undercut to mate with a dove-tailed tongue 18 formed on and beneath the upper member, the two members being thus held interengaged, and the upper member being accurately guided in sliding along the faces 17.

The upper member is formed with a recess 19, opening at its rear end, and also opening downwardly through said dovetail tongue 18. The lower member is also formed with a recess 20, opening forwardly, and also opening upwardly through the aforesaid groove 17a and into the recess 19. Such recesses mutually house the drive means described heretofore. A slot 20a is formed in the lower member 7 allowing access from beneath to make minor adjustments at the universal joint 9 and 10.

Extending forwardly in the lower member from its rear end are two bores 21, parallel to and equally spaced from said recess 20, and adjacent to the bottom of the groove 17a. Screws 22 in the open rear ends of said bores retain therein, under considerable compression, springs 23 each forwardly reacting against a flattened surface 24a of a stud 24, having its upper portion 24b threaded into the aforementioned dove-tail tongue, whereby the upper member is urged forward, response of such member being limited by the forward end of the bores 21.

Surmounting the upper member of the tool holder and set into a groove 25 extending across such member is a bracket 26 rigidly secured by screws 27. Fixed in said bracket transversely of the upper member are pins 28, pivoting a block 29. The threaded forward portion of a stop rod 30 extends freely through such block, and has an adjustable stop nut 31 in front of said block. A second nut 32 serves to lock the first nut in any desired position on said stop rod. Rearward extent of the rod is sufficient to afford its pivotal engagement in a bracket 33 fixed on the frame of the machine.

A cover 34 affords protection to the recesses 19 and 20 against access of dirt, dust and metal fragments.

In use of the described tool holder, the same is fed forwardly by a slide 35 rigidly mounting the lower member until the cutter 1 enters the bore or other opening 36 of a work-piece 37 to be recessed. When the cutter is advanced to its predetermined cutting position, the block 29 which has heretofore been riding forward along the stop rod, encounters the stop nut 31 and the supported member 6 is restrained from further advance. At the member 7 continues its advance, the springs 23 are progressively compressed and the member 6 is cammed laterally to first engage the cutter 1 with the wall of the bore 36 and then feed the cutter into such wall, the depth of cut being determined by the camming advance. During initial retraction of the member 7 following cutting of a recess, the member 6 maintains its forward limiting position, compression of the springs 23 however being progressively relieved and the member 6 progressively shifting toward the longitudinal axis of the holder, whereby the cutter is withdrawn from the cut recess. When the studs 24 encounter the forward ends of the bores 21, the members 6 and 7 retract in unison.

The driven shaft 4 and the drive shaft 13 are in substantial axial alignment at the beginning of a recessing operation. The ensuing camming of the member 6 of course shifts the driven shaft radially out of such alignment, and the continued advance of the member 7 toward the work shifts the drive shaft along its rotative axis toward the driven shaft. As best illustrated in Fig. 3, the splined shaft 11 responds to and affords the axial shifting of said drive shaft by sliding more deeply into its mating socket 12a in the sleeve 13. The universal joints afford a continuous drive during the recessing operation, even although the aforesaid splined shaft and sleeve must rotate in a divergent relation to the drive and driven shafts due to lateral shifting of the latter.

A high degree of precision is attainable with the described construction due to the accurate dove-tailed interconnection of the two members 6 and 7, and further resulting from the firm support afforded by the construction for the drive shaft 4 and the chuck 3. The holder is rendered more adaptable to different types of screw machines and suited to a greater variety of jobs by provision of the rotary cutter, and the vital flexibility of the coupling means between the driven and driving shafts.

A maximum compactness is achieved by housing the drive mechanism within the tool-holder, and this derives the further advantage that said mechanism is protected from abrasive elements such as dust and metal particles. The construction further avoids such exposure of said mechanism as might result in accidental injury to a machine operator. The protection discussed is, of course, substantially completed by the aforesaid cover 34.

Use of a rotatively driven cutter permits of recessing to greater depths and taking wider cuts than is feasible through use of a non-rotating cutter. Another advantage of the rotating cutter is that it permits greater accuracy in forming a desired recess.

What I claim is:

1. A recessing tool-holder comprising a supporting and a supported member, means for guiding the supported member in a rectilinear travel to and from the work, said members having contiguous cam faces acutely divergent to the direction of said travel, means interconnecting said members and guiding them in relative travel along said faces in the direction of said divergency, spring means reacting between the two members and urging the supported member toward the work, means limiting response of the supported member to the spring means, stop-engaging means carried by the supported member, effective upon encountering a stop during advance of the tool-holder toward the work to induce a relative travel of the members along said cam faces, a driven shaft journaled in said supported member and adapted to carry a cutter, a drive shaft journaled in said supporting member and axially spaced from said driven shaft, and coupling means interconnecting said shafts and adapted to maintain a continuous drive during said relative travel.

2. A recessing tool-holder as set forth in claim 1, said relative travel shifting the supported member and driven shaft transversely to the drive shaft, and said coupling means including a flexible joint affording a continuous drive between said shafts during such shifting.

3. A recessing tool-holder as set forth in claim 1, the rectilinear travel of the supporting member carrying the drive shaft in an axial direction toward and away from the driven shaft, and said coupling means including extensible elements affording a continuous drive between said shafts during said travel.

4. A recessing tool-holder as set forth in claim 1, the relative travel of said members shifting the supported member and driven shaft with respect to and transversely to the rotative axis of the drive shaft, and the rectilinear travel of the supporting member shifting the drive shaft along its rotative axis toward and away from the driven shaft, and said coupling means including an intermediate shaft, a sleeve slidably and telescopically receiving and driving the intermediate shaft, a flexible joint disposed between said driven and intermediate shafts, and a second flexible joint disposed between the sleeve and said drive shaft.

References Cited in the file of this patent
UNITED STATES PATENTS

| | | |
|---|---|---|
| 2,228,498 | Young | Jan. 14, 1941 |
| 2,495,291 | Schlitters | Jan. 24, 1950 |